United States Patent
Lee et al.

(10) Patent No.: US 8,630,213 B2
(45) Date of Patent: Jan. 14, 2014

(54) APPARATUS AND METHOD FOR TRANSMITTING SIGNAL IN WIRELESS COMMUNICATION SYSTEM

(75) Inventors: Mi-Hyun Lee, Seongnam-si (KR); Jung-Je Son, Yongin-si (KR); Ji-Yun Seol, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 12/939,509

(22) Filed: Nov. 4, 2010

(65) Prior Publication Data

US 2011/0110301 A1 May 12, 2011

(30) Foreign Application Priority Data

Nov. 11, 2009 (KR) ................. 10-2009-0108391

(51) Int. Cl.
*H04L 5/22* (2006.01)

(52) U.S. Cl.
USPC .......... 370/300; 370/311; 370/350; 370/503; 370/395.4; 370/490

(58) Field of Classification Search
USPC ......... 370/410, 426, 454, 478, 311, 350, 503, 370/395.4, 490, 504
See application file for complete search history.

(56) References Cited

U.S. PATENT DOCUMENTS

| | | | | |
|---|---|---|---|---|
| 6,480,476 B1* | 11/2002 | Willars | ......................... | 370/311 |
| 6,556,550 B1* | 4/2003 | Rasanen | ...................... | 370/329 |
| 8,134,965 B2* | 3/2012 | Lee et al. | ...................... | 370/329 |
| 2002/0090960 A1* | 7/2002 | Laroia et al. | .................. | 455/458 |
| 2007/0174465 A1* | 7/2007 | Huang et al. | .................. | 709/227 |
| 2008/0182567 A1* | 7/2008 | Zhu et al. | ...................... | 455/418 |
| 2009/0154438 A1* | 6/2009 | Kim et al. | ...................... | 370/338 |
| 2010/0110874 A1* | 5/2010 | Kang et al. | .................... | 370/208 |
| 2010/0113049 A1* | 5/2010 | Lee et al. | ...................... | 455/450 |
| 2010/0120438 A1* | 5/2010 | Kone et al. | .................... | 455/444 |

OTHER PUBLICATIONS

Kim et al. (Operation for inactive mode of femto base stations in IEEE 802.16m);Oct. 2008;IEEE ; pp. 1-4.*
Park et al. ("Text fo the IEEE 802.16m Amendment on Femtocell Low Duty Operation"); 2007; IEEE ; p. 1-5.*

* cited by examiner

*Primary Examiner* — Ricky Ngo
*Assistant Examiner* — Dewanda Samuel
(74) *Attorney, Agent, or Firm* — Jefferson IP Law, LLP

(57) ABSTRACT

An apparatus and a method for transmitting control information in a small base station of a wireless communication system are provided. In the method, when the small base station operates in a Low Duty operation Mode (LDM) in a superframe, a control signal including LDM operation information is generated. Only a subframe via which a preamble, a control signal including the LDM operation information, and a SuperFrame Header (SFH) are transmitted is transmitted during the superframe. When the small base station operates in a normal operation mode in a superframe, at least one of the control information and data is transmitted via at least one subframe of the superframe.

22 Claims, 8 Drawing Sheets

APPARATUS AND METHOD FOR TRANSMITTING SIGNAL IN WIRELESS COMMUNICATION SYSTEM

PRIORITY

This application claims the benefit under 35 U.S.C. §119 (a) of a Korean patent application filed in the Korean Intellectual Property Office on Nov. 11, 2009 and assigned Serial No. 10-2009-0108391, the entire disclosure of which is hereby incorporated by reference.

BACKGROUND OF THE INVENTION

1. Field of the Invention

The present invention relates to a wireless communication system. More particularly, the present invention relates to an apparatus and a method for transmitting control information of a small base station that operates in a Low Duty operation Mode (LDM) to a terminal.

2. Description of the Related Art

A wireless communication system may provide a femto cell service for providing a high-speed data service while solving a service problem of a propagation shadow area. The femto cell denotes a small cell area formed by a small base station accessing a mobile communication core network via a broadband network installed in an indoor space such as an office and a household. Here, the small base station denotes a base station of small power that a user installs in person, and includes any or all of a micro base station, a self configurable base station, a compact base station, an indoor base station, a home base station, and a femto base station. In the following description, it is assumed that the small base station is a femto base station.

The femto base station operates in a normal operation mode or a Low Duty operation Mode (LDM). For example, in a case where terminals that access the femto base station operate in an idle mode or a sleep mode, or a terminal that accesses the femto base station does not exist, the femto base station operates in the LDM in order to reduce interference for neighboring cells. At this point, an LDM section where the femto base station operates in the LDM is divided into an Available Interval (AI) during which the femto base station transmits control information, and an UnAvailable Interval (UAI) during which the femto base station does not transmit a signal.

A terminal of a cellular system may recognize a base station based on a preamble or broadcast control information transmitted by the base station, and try a cell selection to the base station. However, in a case where the femto base station enters an UAI, the femto base station does not transmit a signal. Accordingly, the terminal cannot recognize the femto base station that has entered the UAI. For example, when a user turns on power of a terminal at a position adjacent to a femto base station that has entered an UAI, there is a problem since the terminal cannot recognize the femto base station even though the terminal is adjacent to the femto base station and so the terminal attempts to access a macro base station. In another example, a terminal that operates in an idle mode cannot recognize the femto base station and so it cannot perform a position update. In a further example, during a handover, the terminal cannot scan the femto base station that has entered a UAI.

Another problem is that overhead may occur when a macro base station including the femto base station transmits information regarding an operating mode of the femto base station to a terminal so that the terminal may search for the femto base station that has entered a UAI.

Therefore, a need exists for a system and method for transmitting information of a femto base station that operates in a LDM in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for transmitting information of a small base station in a wireless communication system.

Another aspect of the present invention is to provide an apparatus and a method for transmitting information of a femto base station in a wireless communication system.

A further aspect of the present invention is to provide an apparatus and a method for transmitting information of a femto base station that operates in a Low Duty operation Mode (LDM) in a wireless communication system.

Yet another aspect of the present invention is to provide an apparatus and a method for transmitting information of a femto base station that operates in an LDM using a Super Frame Header (SFH) in a wireless communication system.

Yet still another aspect of the present invention is to provide an apparatus and a method for transmitting information of a femto base station that operates in an LDM using a control and resource allocation information (MAP) in a wireless communication system.

In accordance with an aspect of the present invention, a method for transmitting control information at a small base station of a wireless communication system is provided. The method includes, when the small base station operates in a LDM in a superframe, generating a control signal including LDM operation information, transmitting only a subframe via which a preamble, a control signal including the LDM operation information, and a SFH are transmitted during the superframe, and when the small base station operates in a normal operation mode in the superframe, transmitting at least one of control information and data via at least one subframe of the superframe.

In accordance with another aspect of the present invention, an apparatus of a small base station, for transmitting control information in a wireless communication system is provided. The apparatus includes a LDM controller for determining an operation mode of the small base station, a message generator for generating a control signal including operation information of the small base station, and a controller for, when the small base station operates in an LDM in a superframe, controlling the transmission of only a subframe via which a preamble, a control signal including the LDM operation information, and a SFH are transmitted during the superframe, and when the small base station operates in a normal operation mode in the superframe, controlling the transmission of at least one of control information and data via at least one subframe of the superframe.

Other aspects, advantages, and salient features of the invention will become apparent to those skilled in the art from the following detailed description, which, taken in conjunction with the annexed drawings, discloses exemplary embodiments of the present invention.

BRIEF DESCRIPTION OF THE DRAWINGS

The above and other aspects, features, and advantages of certain exemplary embodiments of the present invention will

Throughout the drawings, like reference numerals will be understood to refer to like parts, components and structures.

DETAILED DESCRIPTION OF EXEMPLARY EMBODIMENTS

Figure 1:
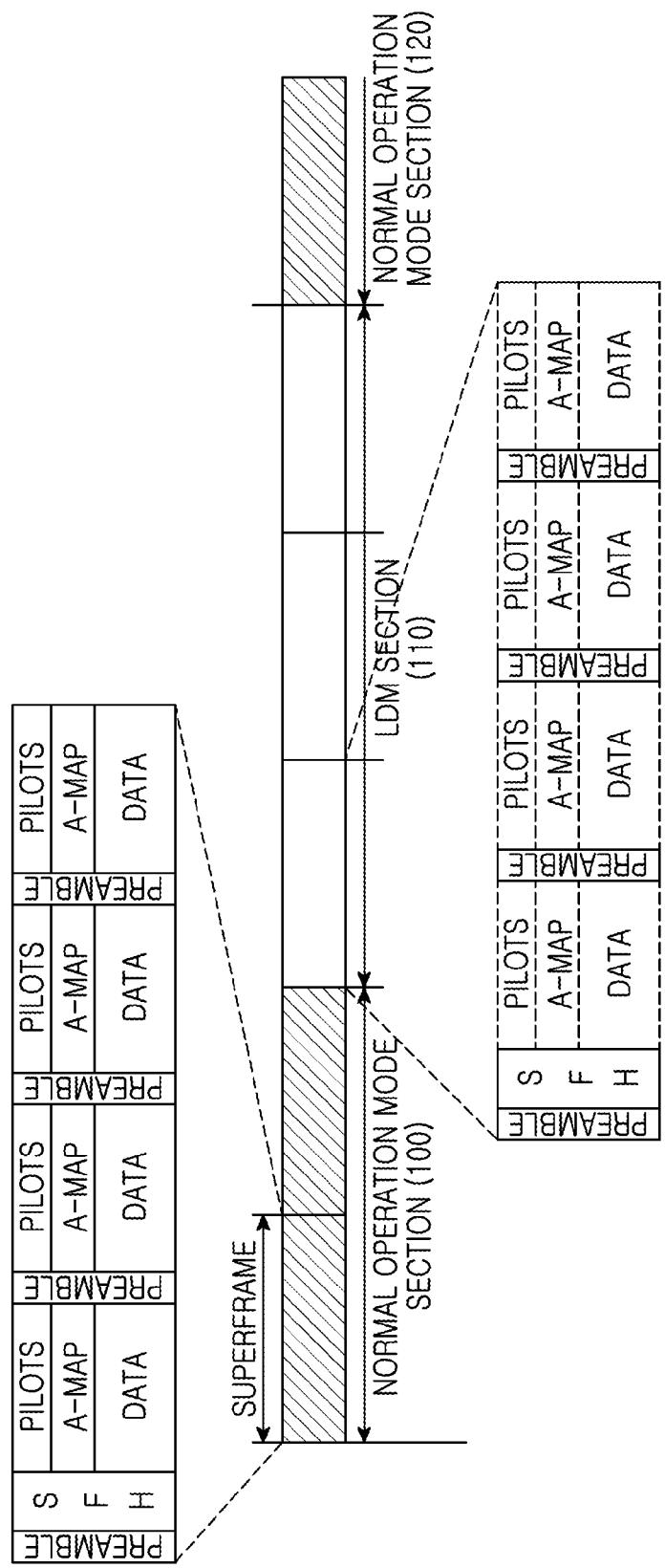
FIG. 1 is a view illustrating a superframe in a wireless communication system according to an exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for transmitting control information of a small base station that operates in a Low Duty operation Mode (LDM) to a terminal in a wireless communication system. Here, the small base station denotes a base station of small power that a service provider, a company, or a user installs in person, and includes a micro base station, a self configurable base station, a compact base station, an indoor base station, a home base station, and a femto base station. In the following description, it is assumed that the small base station is a femto base station.

Though it is assumed that a wireless communication system uses an Institute of Electrical and Electronics Engineers (IEEE) 802.16m in the following description, the description is applicable to a different wireless communication system where a femto base station is installed.

FIGS. 1 through 8, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a view illustrating a superframe in a wireless communication system according to an exemplary embodiment of the present invention.

Referring to FIG. 1, a femto base station configures a frame on a superframe basis. Here, the superframe includes four frames. Each frame is configured to transmit a preamble and a plurality of subframes. One subframe is configured to transmit a pilot, control and resource allocation information (MAP), and data. At this point, a first subframe of the plurality of subframes forming a first frame of the superframe includes a SuperFrame Header (SFH). The MAP is divided into a basic control channel MAP that transmits decoding information of the control and resource allocation information, and an Advanced-MAP (A-MAP) that transmits a specific user control or the control and resource allocation information.

In a case where a femto base station operates in a normal operation mode (100 and 120), the femto base station transmits a preamble, a pilot, a MAP, and data via a superframe. Here, a transmission amount of the data may change depending on a loading state inside a cell. However, the preamble, a superframe header, a common pilot, and a basic MAP are always transmitted via predefined positions inside the superframe.

In a case where the femto base station operates in an LDM (110), the femto base station transmits only a first subframe, via which an SFH is transmitted, and a preamble via a superframe. At this point, a terminal adjacent to the femto base station may obtain an identifier of the femto base station, system control information via the SFH, and the preamble transmitted by the femto base station. Here, the system control information includes basic information (for example, ranging information) that may be used to access the femto base station.

As described above, the femto base station transmits the preamble and the SFH, which includes the identifier of the femto base station and the system information, to the terminal so that the terminal may recognize the femto base station while the femto base station operates in the LDM. At this point, the femto base station transmits operation mode information of the femto base station to the terminal so that the terminal may recognize the operation mode of the femto base station. For example, the femto base station incorporates the operation mode information of the femto base station into a Primary (P)-SFH and transmits the same as illustrated in FIG. 2.

Figure 2:
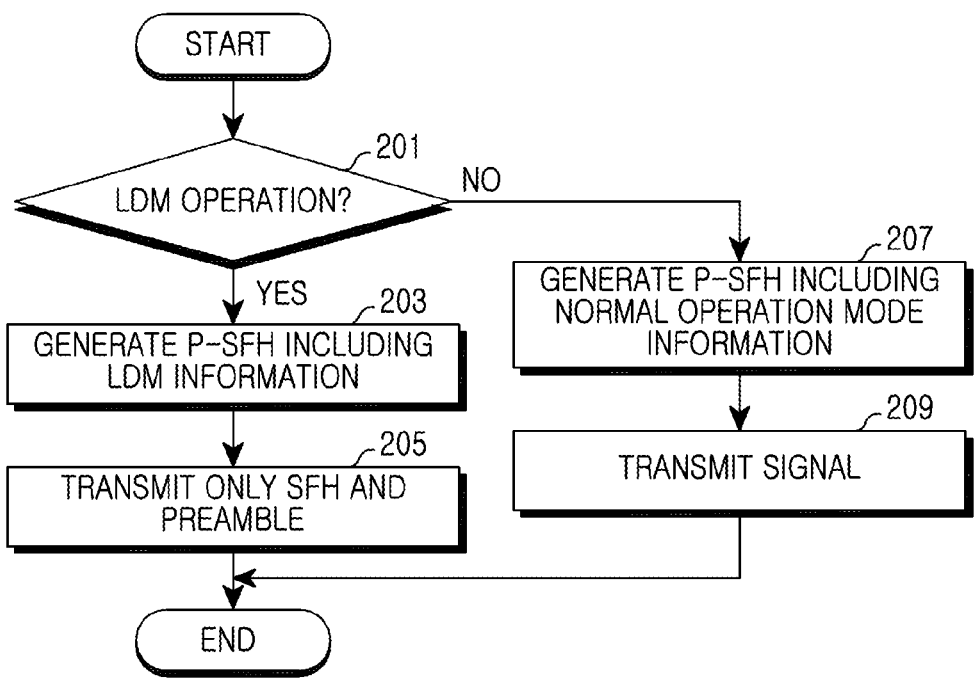
FIG. 2 is a flowchart illustrating a procedure for transmitting operation mode information through a Primary-SuperFrame Header (P-SFH) at a femto base station according to an exemplary embodiment of the present invention.

FIG. 2 is a flowchart illustrating a procedure for transmitting operation mode information through P-SFH at a femto base station according to an exemplary embodiment of the present invention.

Referring to FIG. 2, the femto base station determines in step 201 whether the femto base station operates in an LDM in a current superframe.

If it is determined in step 201 that the femto base station operates in the LDM, the femto base station generates a P-SFH, which includes LDM information, in step 203. For example, the femto base station generates P-SFH Information Element (IE) indicating an LDM operation through a variable base station operation mode as illustrated in Table 1 below.

TABLE 1

| Syntax | Size(bit) | Notes |
|---|---|---|
| P-SFH IE format( ){ | | |
| Femto ABS operation mode | 1 | 0b0: Normal operation modes<br>0b1: LDM(Femto ABS sends only SFH and Preamble) |
| } | | |

After generating the P-SFH IE indicating the LDM operation in step 203, the femto base station configures a superframe using only a subframe that transmits a preamble and an SFH, which includes the P-SFH IE, and transmits the same in step 205. That is, the femto base station that operates in the LDM does not transmit a signal via the rest of the subframes except the subframe that transmits the preamble and the SFH. Here, the SFH includes a P-SFH IE including the base station operation mode information.

In contrast, if it is determined in step 201 that the femto base station does not operate in the LDM, the femto base station operates in a normal operation mode. Accordingly, the femto base station generates a P-SFH IE including the normal operation mode information in step 207.

After generating the P-SFH IE of the femto base station, the femto base station transmits a signal via a first subframe via which a preamble and an SFH are transmitted and the rest of the subframes forming a superframe in step 209. For example, the femto base station transmits an SFH, a preamble, a pilot, a MAP, and data via a superframe configured as illustrated in FIG. 1. At this point, the femto base station may change an amount of data to be transmitted depending on a loading state inside a cell. However, the femto base station always transmits the preamble, the SFH, a common pilot, and a basic MAP via predefined positions inside the superframe.

Thereafter, the femto base station ends the present algorithm. That is, the femto base station ends an operation for the superframe, which has determined whether the femto base station operates in the LDM. The femto base station then returns to step 201 to determine whether it operates in the LDM in the next superframe.

As described above, the femto base station transmits operation mode information of the femto base station to the terminal. At this point, the terminal may determine the operation mode information of the femto base station as illustrated in FIG. 3.

Figure 3:
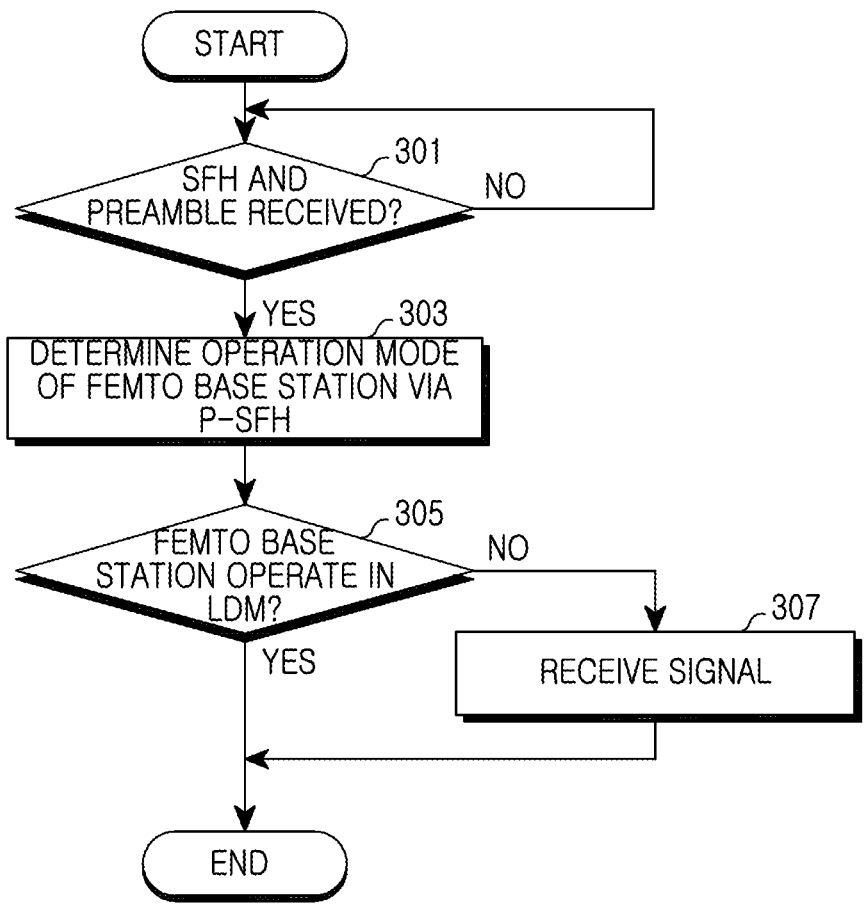
FIG. 3 is a flowchart illustrating a procedure for determining operation mode information through a P-SFH at a terminal according to an exemplary embodiment of the present invention.

FIG. 3 is a flowchart illustrating a procedure for determining operation mode information through P-SFH at a terminal according to an exemplary embodiment of the present invention.

Referring to FIG. 3, the terminal determines in step 301 whether an SFH and a preamble of the femto base station are received.

When receiving the SFH and the preamble of the femto base station, the terminal determines the operation mode of the femto base station through a P-SFH IE included in the SFH in step 303. For example, the terminal determines the operation mode of the femto base station indicated by a femto base station operation mode field value of the P-SFH IE.

At this point, the terminal determines in step 305 whether the femto base station operates in the LDM depending on the operation mode of the femto base station (determined in step 303).

If it is determined in step 305 that the femto base station operates in the LDM, the terminal determines that the femto base station does not transmit other signals except a first subframe that transmits an SFH and a preamble. Accordingly, the terminal does not wait that a MAP, a pilot, and data are to be received via the rest of the subframes except the first subframe (received in step 301) via which the preamble and the SFH are transmitted.

In contrast, if it is determined in step 305 that the femto base station operates in the normal operation mode, the terminal receives a signal transmitted by the femto base station in step 307. For example, the terminal receives a signal via the rest of the subframes existing after the first subframe including the preamble and the SFH received in step 301.

Finally, the terminal ends the present algorithm.

In the above exemplary embodiment, the femto base station transmits the operation mode information of the femto base station to the terminal using the P-SFH IE.

In an exemplary embodiment, the femto base station may transmit the operation mode information of the femto base station to the terminal using a basic control channel MAP. Here, the basic control channel MAP may be represented by a Non User Specific (NUS) A-MAP IE in the IEEE 802.16M standard. At this point, the basic control channel MAP indicating the operation mode information of the femto base station is transmitted via a first subframe via which an SFH is transmitted.

Figure 4:
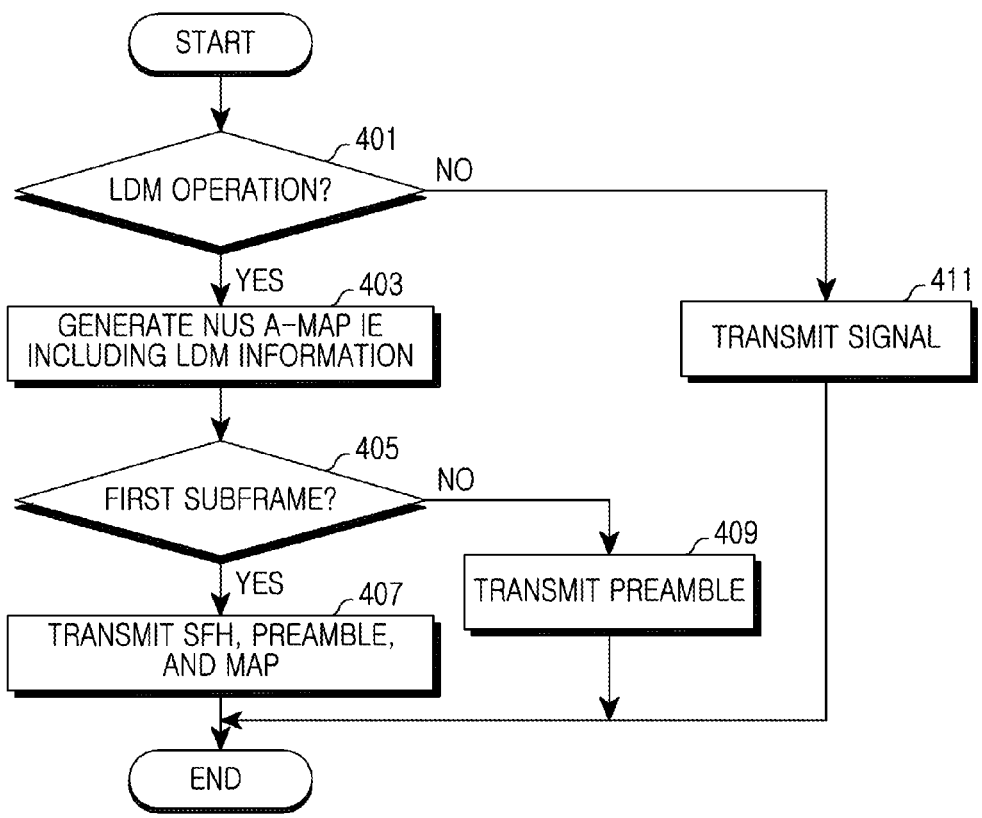
FIG. 4 is a flowchart illustrating a procedure for transmitting operation mode information through a MAP at a femto base station according to an exemplary embodiment of the present invention.

FIG. 4 is a flowchart illustrating a procedure for transmitting operation mode information through a MAP at a femto base station according to an exemplary embodiment of the present invention.

Referring to FIG. 4, the femto base station determines in step 401 whether it operates in the LDM in a current superframe.

If it is determined in step 401 that the femto base station operates in the LDM, the femto base station sets base station operation mode information included in an NUS A-AMP IE to the LDM operation mode in step 403. For example, the femto base station generates the NUS A-MAP IE indicating the LDM operation through a variable base station operation mode as illustrated in Table 2 below.

TABLE 2

| Syntax | Size(bit) | Notes |
|---|---|---|
| ABS operation mode | 1 | 0b0: Normal operation modes<br>0b1: LDM(ABS sends only SFH and Preamble) |

After generating the NUS A-MAP IE including the base station operation mode information in step 403, the femto base station determines in step 405 whether a current subframe is a first subframe of the subframes forming a superframe, which transmits an SFH.

If it is determined in step 405 that the current subframe is the first subframe that transmits the SFH, the femto base station transmits an SFH, a preamble, and a MAP in step 407. Here, the MAP includes a NUS A-MAP IE including the LDM information.

In contrast, if it is determined in step 405 that the current subframe is not the first subframe that transmits the SFH, the femto base station transmits only a preamble in step 409.

If it is determined in step 401 that the femto base station does not operate in the LDM, the femto base station operates in the normal operation mode. Accordingly, the femto base station transmits a signal in step 411. For example, the femto base station transmits an SFH, a preamble, a pilot, and a MAP via a superframe configured as illustrated in FIG. 1. When data to be transmitted to a terminal exists, the femto base station transmits an SFH, a preamble, a pilot, a MAP, and data via the superframe. In this case, the femto base station may transmit a MAP including a NUS A-MAP IE. In addition, the femto base station may indicate that data transmitted via a current subframe, frame, or superframe does not exist via a NUS A-MAP IE.

Thereafter, the femto base station ends the present algorithm. That is, the femto base station ends an operation for the superframe, which has determined whether the femto base station operates in the LDM in step 401. The femto base station then returns to step 401 to determine whether the femto base station operates in the LDM in the next superframe.

In the above exemplary embodiment, the femto base station transmits a NUS A-MAP IE using a first subframe that transmits an SFH. However, the femto base station may transmit the NUS A-MAP IE via an arbitrary subframe. In the case where the femto base station transmits the NUS A-MAP IE via an arbitrary subframe, the base station operation mode information of the NUS A-MAP IE may display whether data exists in the subframe.

In the above exemplary embodiment, the femto base station transmits operation mode information of the femto base station to the terminal using the NUS A-MAP IE.

In an exemplary embodiment, the femto base station may transmit operation mode information of the femto base station to the terminal using an A-MAP newly configured to include the operation mode information of the femto base station. In this case, the newly configured A-MAP may clearly express not only femto base station operation mode information but also an operation section of the femto base station.

Figure 5:
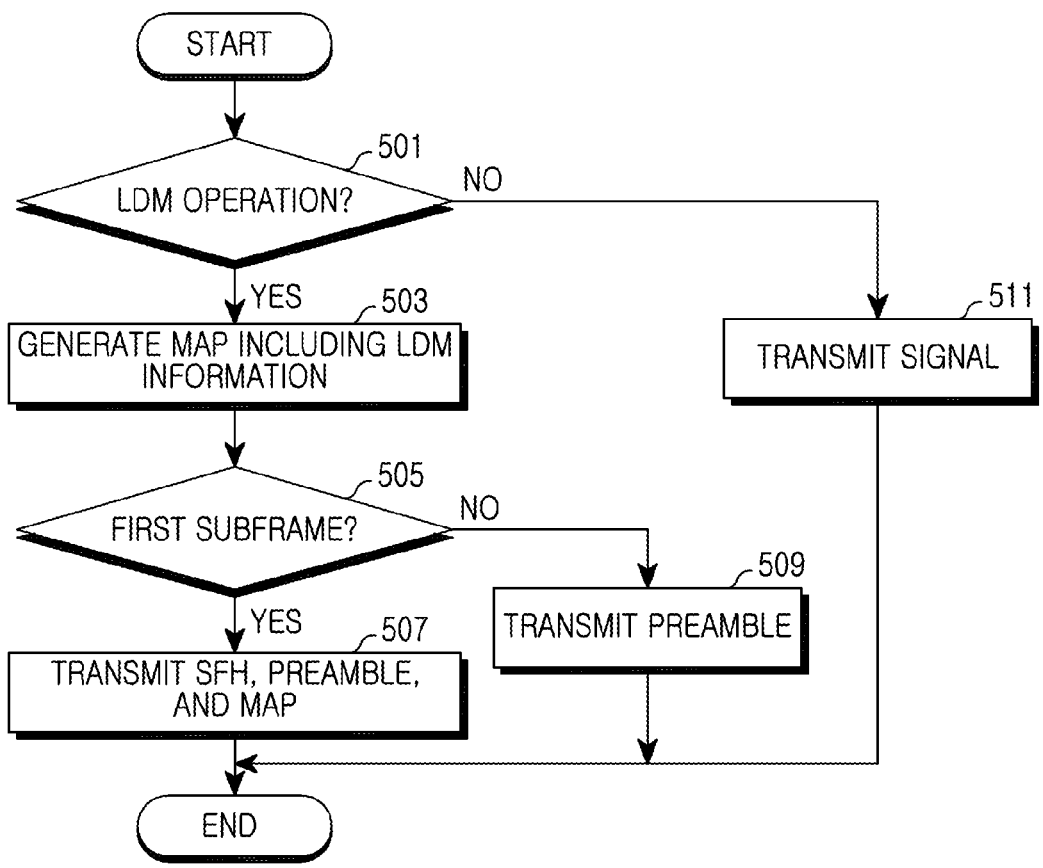
FIG. 5 is a flowchart illustrating a procedure for transmitting operation mode information through a MAP at a femto base station according to an exemplary embodiment of the present invention.

FIG. 5 is a flowchart illustrating a procedure for transmitting operation mode information through a MAP at a femto base station according to an exemplary embodiment of the present invention.

Referring to FIG. 5, the femto base station determines in step 501 whether it operates in the LDM in a current superframe.

If it is determined in step 501 that the femto base station operates in the LDM, the femto base station generates a MAP including LDM operation information in step 503. For example, the femto base station generates an LDM A-MAP of the base station to include LDM operation information as illustrated in Table 3 below.

TABLE 3

| Syntax | Size(bit) | Notes |
|---|---|---|
| ABS_LDM_Mode_A-MAP IE( ){ | | |
|   IE_Type | TBD | |
|   Return Time | TBD | Indicates the time until ABS return to Normal mode. |
| } | | |

Here, the LDM A-MAP is transmitted in the case where the femto base station operates in the LDM. At this point, the terminal may determine whether the femto base station operates in the LDM using an IE type field value of the LDM A-MAP.

After generating an A-MAP including the operation mode information of the base station in step 503, the femto base station determines whether a current subframe is a first subframe of the subframes forming a superframe, which transmits an SFH in step 505.

If it is determined in step 505 that the current subframe is the first subframe that transmits the SFH, the femto base station transmits the SFH, a preamble, and an A-MAP in step 507. Here, the A-MAP includes LDM operation mode information of the femto base station.

In contrast, if it is determined in step 505 that the current subframe is not the first subframe that transmits the SFH, the femto base station transmits only a preamble in step 509.

If it is determined in step 501 that the femto base station does not operate in the LDM, the femto base station operates in the normal operation mode. Accordingly, the femto base station transmits a signal in step 511. For example, the femto base station transmits an SFM, a preamble, a pilot, and a MAP via a superframe configured as illustrated in FIG. 1. When data to be transmitted to a terminal exists, the femto base station transmits an SFH, a preamble, a pilot, a MAP, and the data via the superframe.

Thereafter, the femto base station ends the present algorithm. That is, the femto base station ends the operation for the superframe, which has determined whether the femto base station operates in the LDM in step 501. The femto base station then returns to step 501 to determine whether the femto base station operates in the LDM in the next superframe.

As described above, the femto base station configures a new A-MAP for transmitting operation mode information of the femto base station. At this point, the femto base station may indicate that data to be transmitted via a current subframe, frame, or superframe does not exist through the newly configured A-MAP. In addition, the femto base station may indicate point information identifying a point at which the femto base station returns to the normal operation mode through the newly configured A-MAP. Accordingly, the terminal may know the operation mode information of the femto base station and the point information identifying the point at which the femto base station returns to the normal operation mode through the A-MAP newly configured by the femto base station. In this case, since the terminal may recognize that a signal is not received while the femto base station operates in the LDM, unnecessary power consumption may be reduced.

The femto base station may indicate point information that corresponds to the point at which the femto base station returns to the normal operation mode using the newly configured A-MAP. However, in the case where the terminal attempts to access the femto base station using system information obtained from an SFH in order to perform a fast access, when the femto base station receives a signal related to an access attempt of the terminal, the femto base station may switch to the normal operation mode. That is, the femto base station may switch to the normal operation mode at the point when the terminal attempts to access the femto base station, not a point when the normal operation mode is returned to as indicated by the newly configured A-MAP.

In the above exemplary embodiment, the femto base station transmits a newly configured A-MAP using the first subframe that transmits the SFH. However, the femto base station may transmit the A-MAP in an arbitrary subframe after an NUS A-MAP IE.

Figure 6:
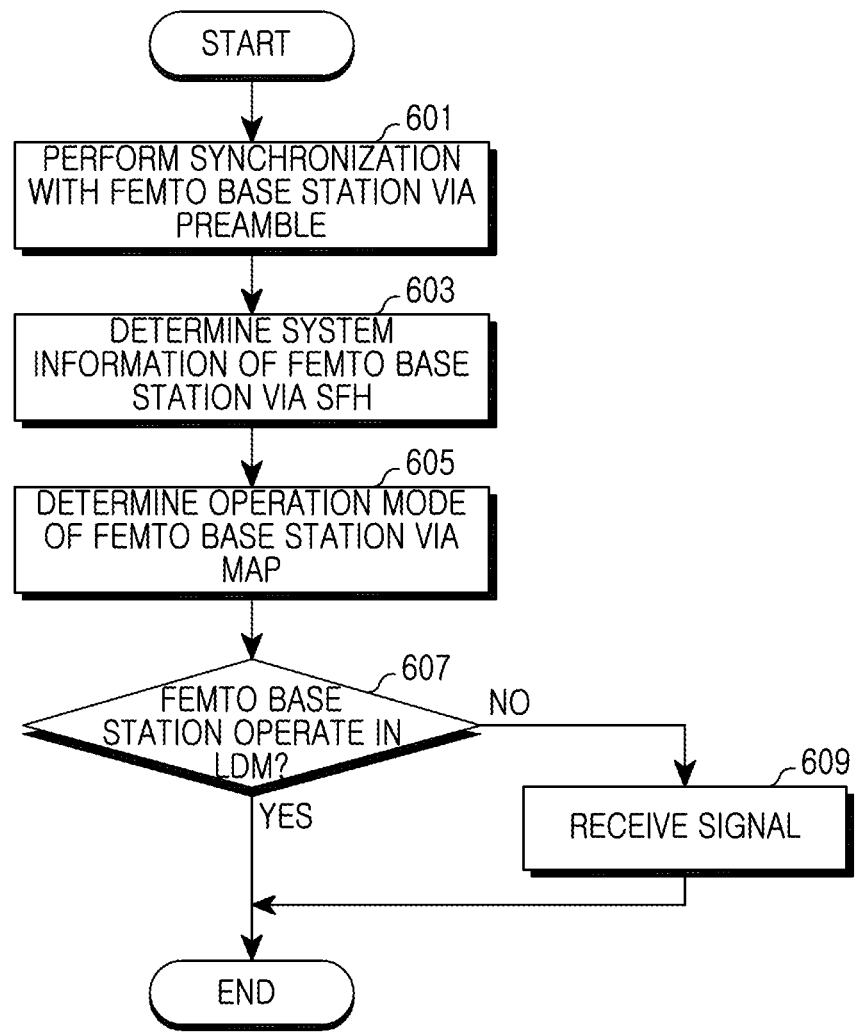
FIG. 6 is a flowchart illustrating a procedure for determining an operation mode of a femto base station through a MAP at a terminal according to an exemplary embodiment of the present invention.

In the case where the femto base station transmits the operation mode information of the femto base station to the terminal as illustrated in FIGS. 4 and 5, the terminal may determine the operation mode information of the femto base station as illustrated in FIG. 6.

FIG. 6 is a flowchart illustrating a procedure for determining an operation mode of a femto base station through a MAP at a terminal according to an exemplary embodiment of the present invention.

Referring to FIG. 6, the terminal performs synchronization with the femto base station through a preamble provided from the femto base station in step 601.

In step 603, the terminal obtains system information of the femto base station through an SFH provided from the femto base station.

After obtaining the system information of the femto base station, the terminal determines the operation mode of the femto base station through a MAP included in a first subframe via which the SFH is transmitted in step 605. For example, the terminal determines the operation mode of the femto base station through an 'ABS operation mode' field value of an NUS A-MAP IE included in the first subframe. For another example, the terminal may determine an operation mode of the femto base station through an IE type field value of an LDM A-MAP of the base station included in the first subframe. At this point, the terminal may determine a point at which the femto base station returns to the normal operation mode through a return field value of the LDM A-MAP.

In step 607, the terminal determines whether the femto base station operates in the LDM depending on the operation mode of the femto base station (determined in step 605).

If it is determined in step 607 that the femto base station operates in the LDM, the terminal determines that the femto base station does not transmit other signals except the first subframe via which an SFH is transmitted and a preamble. Accordingly, the terminal does not wait for a MAP, a pilot, and data are to be received via the rest of the subframes except the first subframe via which the preamble and the SFH received in steps 601 and 603 are transmitted. For example, in the case where the terminal determines a return field value via an LDM A-MAP of the base station, the terminal does not wait for reception of a signal until the femto base station returns to the normal operation mode.

In contrast, if it is determined in step 607 that the femto base station operates in the normal operation mode, the terminal receives a signal transmitted by the femto base station in step 609. For example, the terminal receives a signal via the rest of the subframes existing after the first subframe including a preamble, an SFH, and a MAP.

Finally, the terminal ends the present algorithm.

Hereinafter, the construction of a femto base station for transmitting control information in the case where the femto base station operates in the LDM is described. In the following description, it is assumed that the femto base station uses an Orthogonal Frequency Division Multiplexing (OFDM) scheme.

Figure 7:
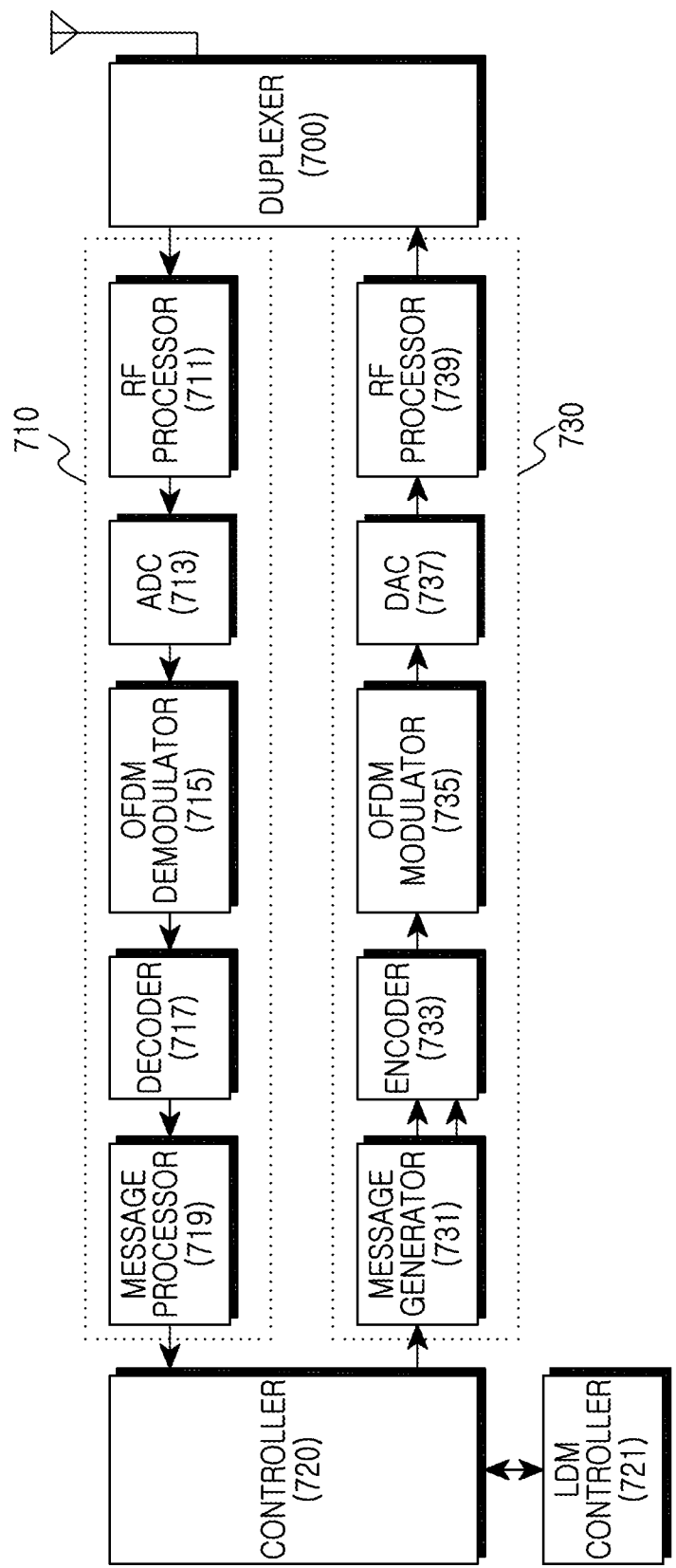
FIG. 7 is a block diagram illustrating a femto base station according to an exemplary embodiment of the present invention.

FIG. 7 is a block diagram illustrating a femto base station according to an exemplary embodiment of the present invention.

Referring to FIG. 7, the femto base station includes a duplexer 700, a receiver 710, a controller 720, and a transmitter 730.

The duplexer 700 transmits a transmission signal provided from the transmitter 730 via an antenna, and provides a reception signal from the antenna to the receiver 710 according to a duplexing scheme.

The receiver 710 includes a Radio Frequency (RF) processor 711, an Analog/Digital Converter (ADC) 713, an OFDM demodulator 715, a decoder 717, and a message processor 719.

The RF processor 711 converts an RF signal provided from the duplexer 700 into a baseband analog signal. The ADC 713 converts an analog signal provided from the RF processor 711 into digital sample data. The OFDM demodulator 715 converts sample data in a time domain provided from the ADC 713 into data in a frequency domain by performing Fourier Transform. For example, the OFDM demodulator 715 converts sample data in the time domain into data in the frequency domain by performing fast Fourier Transform.

The decoder 717 demodulates and decodes a signal provided from the OFDM demodulator 715 according to a predefined modulation level (Modulation and Coding Scheme level).

The message processor 719 detects a control message from a signal provided from the decoder 717 and provides the same to the controller 720.

The controller 720 controls an overall operation of the femto base station. At this point, the controller 720 controls a signal to be transmitted via a superframe depending on an operation mode of the femto base station in the current superframe determined by an LDM controller 721. For example, in the case where the LDM controller 721 determines that the femto base station operates in the LDM, the controller 720 controls to transmit only a subframe that transmits a preamble, femto base station operation mode information, and an SFH. That is, the controller 720 controls not to transmit a signal via the rest of the subframes except the subframe that transmits the preamble, the femto base station operation mode information, and the SFH in the superframe. For a further example, in the case where the LDM controller 721 determines that the femto base station operates in the normal operation mode, the controller 720 controls to transmit a signal via all subframes forming the superframe. That is, the controller 720 controls to transmit an SFH, a preamble, a pilot, a MAP, and data via the superframe configured as illustrated in FIG. 1. At this point, the controller 720 may change an amount of data to be transmitted depending on a loading state inside a cell. However, the controller 720 always transmits the preamble, the SFH, a common pilot, and a basic MAP via predefined positions inside the superframe.

The LDM controller 721 determines whether the femto base station operates in the LDM at a current superframe. For example, in the case where terminals that have accessed the femto base station operate in an idle mode or a sleep mode, or a terminal that has accessed the femto base station does not exist, the LDM controller 721 determines that the femto base station operates in the LDM in order to reduce an inference to a neighboring cell.

The transmitter 730 includes a message generator 731, an encoder 733, an OFDM modulator 735, a Digital/Analog Converter (DAC) 737, and an RF processor 739.

The message generator 731 generates a control message including operation mode information of the femto base station under control of the controller 720. For example, in the case where the femto base station operates in an LDM in a current superframe, the message generator 731 generates a P-SFH IE indicating an LDM operation through a variable base station operation mode as illustrated in Table 1. For a further example, in the case where the femto base station operates in the LDM in a current superframe, the message generator 731 may generate a NUS A-MAP IE indicating an LDM operation through a variable base station operation mode, as illustrated in Table 2. For a further example, in the case where the femto base station operates in the LDM in a current superframe, the message generator 731 may generate an LDM A-MAP of the base station to include LDM operation information as illustrated in Table 3. For a further example, in the case where the femto base station operates in the normal operation mode in a current superframe, the message generator 731 may generate a MAP including control and resource allocation information.

In addition, the message generator 731 generates a preamble and an SFH regardless of the operation mode of the femto base station.

The encoder 733 encodes and modulates a transmission signal or a control signal provided from the message generator 731 according to a relevant MCS level.

The OFDM modulator 735 converts data in the frequency domain provided from the encoder 733 into sample data (OFDM symbol) in the time domain by performing inverse Fourier Transform. For example, the OFDM modulator 735 converts data in the frequency domain into sample data (OFDM symbol) in the time domain by performing inverse fast Fourier Transform.

The DAC 737 converts the sample data provided from the OFDM modulator 735 into an analog signal. The RF processor 739 converts a baseband analog signal provided from the DAC 737 into an RF signal.

In the above exemplary embodiment of the present invention, in the case where the message generator 731 generates a P-SFH IE indicating an LDM operation, as illustrated in Table 1, the femto base station configures a superframe such that the superframe includes only a subframe that transmits an SFH including a preamble and a P-SFH. That is, the femto base station configures the superframe such that the superframe does not transmit a signal via the rest of the subframes except the subframe that transmits the SFH.

In an exemplary embodiment of the present invention, in the case where the message generator 731 generates a NUS A-MAP IE indicating an LDM operation as illustrated in Table 2, the femto base station configures a superframe such that the superframe includes only a subframe that transmits a preamble, an SFH, and the NUS A-MAP IE. That is, the femto base station configures the superframe such that the superframe does not transmit a signal via the rest of the subframes except the subframe that transmits the preamble, the SFH, and the NUS A-MAP IE.

In an exemplary embodiment of the present invention, in the case where the message generator 731 generates an LDM A-MAP of the base station such that the LDM A-MAP includes LDM operation information, as illustrated in Table 3, the femto base station configures a superframe such that the superframe includes only a subframe that transmits a preamble, an SFH, and an LDM A-MAP. That is, the femto base station configures the superframe such that the superframe does not transmit a signal via the rest of the subframes except the subframe that transmits the preamble, the SFH, and the LDM A-MAP.

In the above configuration, the controller 720 controls the LDM controller 721. That is, the controller 720 may perform the function of the LDM controller 721. Separate configuration of the LDM controller 721 is for separately describing respective functions. Therefore, in actual realization, all or some functions of the LDM controller 721 may be processed by the controller 720.

Hereinafter, a construction of a terminal for determining operation mode information of a femto base station is described.

Figure 8:
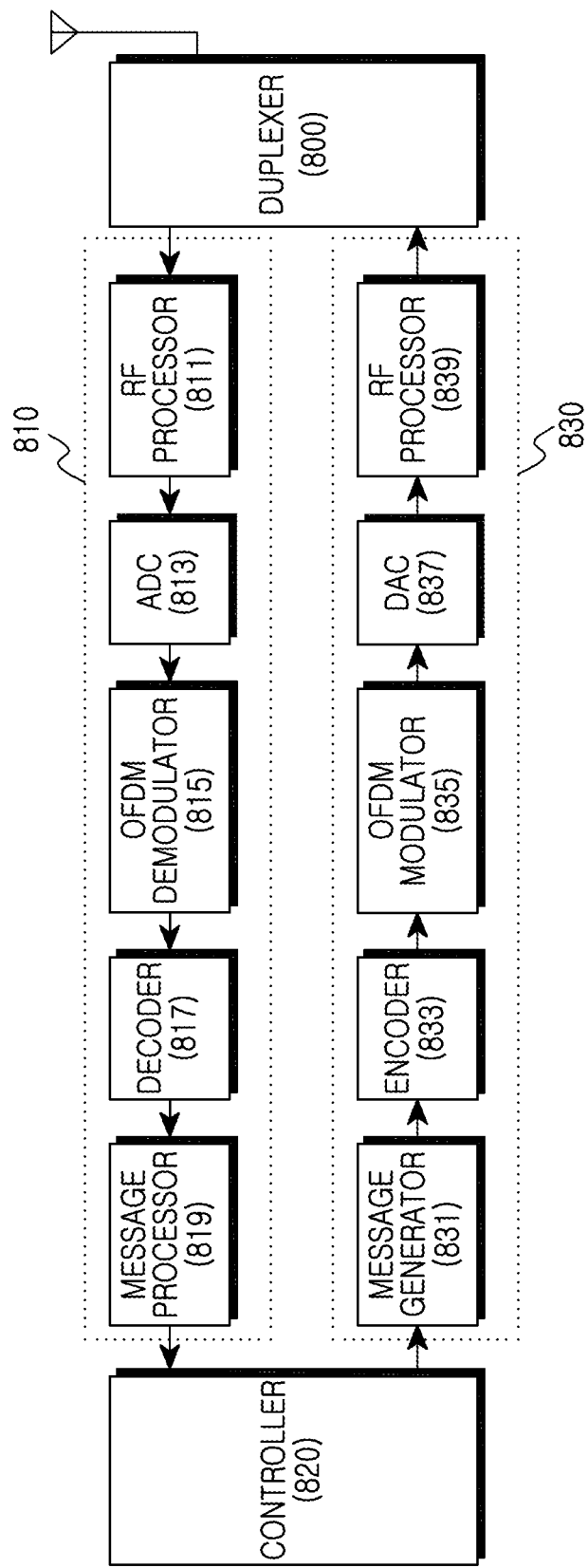
FIG. 8 is a block diagram illustrating a terminal according to an exemplary embodiment of the present invention.

FIG. 8 is a block diagram illustrating a terminal according to an exemplary embodiment of the present invention.

Referring to FIG. 8, the terminal includes a duplexer 800, a receiver 810, a controller 820, and a transmitter 830.

The duplexer 800 transmits a transmission signal provided from the transmitter 830 via an antenna, and provides a reception signal from the antenna to the receiver 810 according to a duplexing scheme.

The receiver 810 includes an RF processor 811, an ADC 813, an OFDM demodulator 815, a decoder 817, and a message processor 819.

The RF processor 811 converts an RF signal provided from the duplexer 800 into a baseband analog signal. The ADC 813 converts an analog signal provided from the RF processor 811 into a digital sample data. The OFDM demodulator 815 converts sample data in the time domain provided from the ADC 813 into data in the frequency domain by performing Fourier Transform. For example, the OFDM demodulator 815 converts sample data in the time domain into data in the frequency domain by performing fast Fourier Transform.

The decoder 817 demodulates and decodes a signal provided from the OFDM demodulator 815 according to a predefined modulation level (Modulation and Coding Scheme level).

The message processor 819 detects a control message from a signal provided from the decoder 817 and provides the same to the controller 820. For example, the message processor 819 detects a preamble including synchronization information provided from the femto base station and an SFH including system information, and provides the same to the controller 820. For another example, the message processor 819 may detect operation mode information of the femto base station included in a P-SFH of the SFH and provide the same to the controller 820. For another example, the message processor 819 may detect operation mode information of the femto base station from a NUS A-MAP IE of a first subframe that transmits an SFH, and provide the same to the controller 820. For another example, the message processor 819 may detect operation mode information of the femto base station from an LDM A-MAP of the base station of the first subframe that transmits the SFH, and provide the same to the controller 820. At this point, the message processor 819 may determine a point at which the femto base station returns to the normal operation mode from the LDM A-MAP.

The controller 820 controls an overall operation of the terminal. At this point, the controller 820 controls a standby of signal reception depending on operation mode information of the femto base station provided from the message processor 819. For example, in the case where the femto base station operates in the LDM, the controller 820 determines that the femto base station does not transmit other signals except a subframe that transmits an SFH and a preamble. Accordingly, since a MAP, a pilot, and data are not received via the rest of the subframes except a first subframe that transmits a preamble, and an SFH, the controller 820 controls not to stand by to receive a signal. For another example, in the case where the femto base station operates in the normal operation mode, the controller 820 recognizes that the femto base station may transmit a signal via all subframes forming a superframe. Accordingly, the controller 820 controls to stand by to receive a signal.

The transmitter 830 includes a message generator 831, an encoder 833, an OFDM modulator 835, a DAC 837, and an RF processor 837.

The message generator 831 generates a control message to be transmitted to a serving base station under control of the controller 820.

The encoder 833 encodes and modulates a transmission signal or a control signal provided from the message generator 831 according to a relevant MCS level.

The OFDM modulator 835 converts data in the frequency domain provided from the encoder 833 into sample data (OFDM symbol) in the time domain by performing the inverse Fourier Transform. For example, the OFDM modulator 835 converts data in the frequency domain into sample data (OFDM symbol) in the time domain by performing inverse fast Fourier Transform.

The DAC 837 converts the sample data provided from the OFDM modulator 835 into an analog signal. The RF processor 837 converts a baseband analog signal provided from the DAC 837 into an RF signal.

As described above, a femto base station that operates in an LDM in a wireless communication system may reduce power consumption and reduce interference to a neighboring base station by transmitting control information of the femto base station to a terminal. In addition, since the terminal may recognize a section during which the femto base station does not transmit a signal, power consumption of the terminal may be reduced.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting control information at a small base station of a wireless communication system, the method comprising:
   generating a control signal that comprises Low Duty operation Mode (LDM) operation information when the small base station operates in an LDM in a superframe, wherein the LDM operation information comprises a parameter indicating a time until the small base station returns to a normal operation mode;
   transmitting, when the small base station operates in the LDM, at least one subframe comprising a preamble, the control signal, and a SuperFrame Header (SFH) during the superframe; and
   transmitting at least one of the control information and data via at least one subframe of the superframe when the small base station operates in the normal operation mode in the superframe.

2. The method of claim 1, further comprising:
   determining that the small base station operates in the LDM in the superframe when at least one terminal that accesses the small base station operates in one of an idle mode and a sleep mode during the superframe; and
   when the small base station operates in the LDM, generating a control signal comprising LDM operation information.

3. The method of claim 1, further comprising:
   determining that the small base station operates in the LDM in the superframe when a terminal that accesses the small base station does not exist; and
   when the small base station operates in the LDM, generating a control signal comprising LDM operation information.

4. The method of claim 1, wherein the generating of the control signal comprises generating a first Primary-SuperFrame Header (P-SFH) Information Element (IE) including LDM operation information when the small base station operates in the LDM in the superframe.

5. The method of claim 1, wherein the generating of the control signal comprises generating a basic control channel MAP including LDM operation information when the small base station operates in the LDM in the superframe.

6. The method of claim 5, wherein the basic control channel MAP includes a Non User Specific (NUS) Advanced-MAP (A-MAP) Information Element (IE).

7. The method of claim 5, wherein the transmitting of the at least one subframe comprises transmitting only a first subframe of the superframe,
   wherein the first subframe includes the preamble, the SFH, and the basic control channel MAP.

8. The method of claim 1, wherein the generating of the control signal comprises generating a MAP including LDM operation information via a type field of an Information Element (IE) when the small base station operates in the LDM in the superframe.

9. The method of claim 8, wherein the MAP comprises point information identifying a point at which the small base station operating in the LDM switches to a normal operation mode.

10. The method of claim 8, wherein the transmitting of the at least one subframe comprises, transmitting a first subframe of the superframe,
    wherein the first subframe includes a MAP and the preamble, during the superframe,
    wherein the MAP includes LDM operation information via the SFH, and the type field of the IE.

11. The method of claim 1, wherein the transmitting of the at least one of the control information and the data comprises, transmitting at least one of the control information including normal operation mode information and the data via at least one subframe of the superframe when the small base station operates in a normal operation mode in the superframe.

12. The method of claim 1, wherein the control information includes at least one of the preamble, the SFH, and control and resource allocation information.

13. An apparatus of a small base station, for transmitting control information in a wireless communication system, the apparatus comprising:
    a Low Duty operation Mode (LDM) controller for determining an operation mode of the small base station;
    a message generator for generating a control signal comprising an LDM operation information of the small base station, wherein the LDM operation information comprises a parameter indicating a time until the small base station returns to a normal operation mode; and
    a controller for controlling the transmission of at least one of a subframe including a preamble, the control signal, and a SuperFrame Header (SFH) during the superframe when the small base station operates in an LDM in a superframe, and for controlling the transmission of at least one of the control information and data via at least one subframe of the superframe when the small base station operates in the normal operation mode in the superframe.

14. The apparatus of claim 13, wherein the LDM controller determines that the small base station operates in the LDM in the superframe when at least one terminal that accesses the small base station operates in one of an idle mode and a sleep mode during the superframe.

15. The apparatus of claim 13, wherein the LDM controller determines that the small base station operates in the LDM in the superframe when a terminal that accesses the small base station does not exist.

16. The apparatus of claim 13, wherein the message generator generates a first Primary-SuperFrame Header (P-SFH) Information Element (IE) comprising LDM operation information when the small base station operates in the LDM in the superframe.

17. The apparatus of claim 13, wherein the message generator generates a basic control channel MAP comprising LDM operation information when the small base station operates in the LDM in the superframe.

18. The apparatus of claim 17, wherein the basic control channel MAP includes a Non User Specific (NUS) Advanced-MAP (A-MAP) Information Element (IE).

19. The apparatus of claim 13, wherein the message generator generates a MAP including LDM operation information via a type field of an Information Element (IE) when the small base station operates in the LDM in the superframe.

20. The apparatus of claim 19, wherein the message generator generates the MAP such that the MAP further includes point information identifying a point at which the small base station operating in the LDM mode switches to a normal operation mode.

21. The apparatus of claim 13, wherein the controller controls to transmit only a first subframe including the preamble, the SFH, and operation mode information of the small base station during the superframe when the small base station operates in the LDM in the superframe.

22. The apparatus of claim 13, further comprising a transmitter for, when the small base station operates in the LDM in the superframe, transmitting at least one subframe including the preamble, the control signal comprising the LDM operation information, and the SFH during the superframe under control of the controller, and transmitting at least one of the control information and data via at least one subframe of the superframe under control of the controller when the small base station operates in a normal operation mode in the superframe.

* * * * *